United States Patent [19]
Daubenspeck et al.

[11] 3,847,640
[45] Nov. 12, 1974

[54] TITANIUM PIGMENT SLURRIES FOR PREPARATION OF LATEX-BASE COATING COMPOSITIONS

[75] Inventors: John M. Daubenspeck, Westfield; Bernard Holton Jett, Redbank, both of N.J.

[73] Assignee: A. L. Industries, Inc., New York, N.Y.

[22] Filed: Mar. 26, 1973

[21] Appl. No.: 344,939

[52] U.S. Cl. .............................. 106/300, 106/308 B
[51] Int. Cl. ............................................. C09c 1/36
[58] Field of Search ............ 106/300, 308 Q, 308 B

[56] References Cited
UNITED STATES PATENTS

| | | | |
|---|---|---|---|
| 3,536,510 | 10/1970 | Allen et al. | 106/300 |
| 3,702,773 | 11/1972 | Hall et al. | 106/300 |
| 3,436,239 | 4/1969 | Feld | 106/300 |
| 3,663,284 | 5/1972 | Starcioff et al. | 106/300 |
| 3,756,841 | 9/1973 | Beliveau | 106/300 |

*Primary Examiner*—Delbert E. Gantz
*Assistant Examiner*—J. V. Howard

[57] ABSTRACT

An aqueous titanium dioxide slurry is prepared by adding a titanium dioxide pigment having relatively high oil absorption characteristics to water in an amount to provide a pigment concentration within the range of above 60 to no more than about 65% on a slurry weight basis, and in the presence of a dispersing agent.

2 Claims, No Drawings

TITANIUM PIGMENT SLURRIES FOR PREPARATION OF LATEX-BASE COATING COMPOSITIONS

BACKGROUND OF THE INVENTION

The practice of shipping titanium dioxide pigment as aqueous slurry rather than as dry pigment bagged for shipment, is relatively recent and has been fostered in large measure by the increased demand for paper and latex-base coating compositions, as well as, the economic advantages attending the elimination of bagging expenses, storage sheds and handling both by manufacture and customer. U.S. Pat. No. 3,663,284, May 16th, 1972, discloses preparation of aqueous $TiO_2$ slurries of from 40 to 80 percent solids, as $TiO_2$, wherein dispersion of the pigment is effected by adding citric or tartaric acids, or salts thereof, preferably in combination with a gum to retard settling, and a sequestering agent for calcium cations.

It has been discovered that a severe loss in tinctorial strength occurs in flat latex-base paints prepared by adding $TiO_2$ pigment, having high tinctorial strength and relatively high oil absorption, as an aqueous slurry having maximum concentrations with respect to rheology, i.e., 68 to 66 percent solids. This loss in tinctorial strength may average from 150 to 300 units.

Although the exact reason for this is not known, it is postulated, on the basis of paint formulation drawdowns, that due to the highly porous nature of the hydrous oxide coatings on the pigment relatively large amounts of water are absorbed which, in conjunction with the work done on the pigment by vigorous agitation, pumping and the like, effects a certain amount of pigment agglomeration with an accompanying loss in tinting strength. Other theories suggest that the porous hydrous oxide coating is altered to reduce its effectiveness in achieving improved tinctorial strength in a given paint system.

SUMMARY OF THE INVENTION

The present invention is the discovery that when preparing high solids aqueous slurries of titanium dioxide pigment for use in flat latex-base coating compositions wherein the titanium dioxide pigment is characterized by high tinctorial strength and relatively high oil absorption, that the concentration of the $TiO_2$ pigment in the aqueous slurry must be within a critical range from greater than 60 percent to no higher than 65 percent and preferably about 64 percent, on a slurry weight basis, in order to obtain latex-base coating compositions of consistantly high tinctorial strengths while accomodating latex paint formulations and minimizing slurry shipping costs.

PREFERRED EMBODIMENT OF THE INVENTION

Pursuant to the objects of the present invention, aqueous slurries of titanium dioxide pigment are prepared by slurrying a titanium dioxide pigment in water in the presence of a suitable dispersing agent, the $TiO_2$ pigment being that grade of pigment commonly used in the preparation of flat latex-base paints and formulations of high pigment volume concentration. These particular titanium dioxide pigments are characterized by high tinctorial strength and relatively high oil absorption. Moreover, the aqueous slurries of this invention are prepared by adding the aforesaid post-treated $TiO_2$ pigment to water in the presence of a suitable dispersing agent. In this connection, it has been found that a number of dispersing agents may be employed, as for example, potassium tripolyphosphate [KTPP], tetrapotassium pyrophosphate [TKPP], monoisapropanolamine [MIPA], and the like. However, from an overall standpoint, it is preferred to use KTPP in an amount from about 0.2 to about 0.7 percent, on a pigment weight basis.

The crux of the invention lies in the type and amount of posttreated $TiO_2$ pigment added to the aqueous dispersion solution. It has now been discovered that when the amount of titanium dioxide pigment added is limited to a critical range above 60 percent to no higher than 65 percent, on a slurry weight basis, preferably about 64 percent, latex-base paints prepared from these slurries will have uniformly high tinctorial strength. Slurries of 60 percent solids or less, as $TiO_2$ pigment, will have good tinting strength, dispersion and rheology, but will comprise so large a proportion of water as to be unsatisfactory in most paint formulations; nor would they be economical to ship.

The titanium dioxide pigment may be produced by either of the two methods commonly practiced in the industry, that is to say, by the so called sulfate process or the chloride process; and preferably in the form of rutile $TiO_2$. Further, the pigment is characterized by relatively high oil absorption, that is to say, in the range of from above 36 to 46, as measured by the weight in gms of linseed oil required to form 100 gms of pigment into a coherent mass. The high oil absorption is generally due to coatings of hydrous oxides, as for example, the hydrous oxides of aluminum, titanium, silicon, and mixtures thereof. Typical coatings may comprise hydrates of silica in the range of from 5 to 8% $SiO_2$, alumina in the range of from 3 to 5% $Al_2O_3$, and titania in the range of from 0 to 2% of a $TiO_2$ weight basis.

The titanium dioxide pigment slurries of this invention were prepared by first forming an aqueous solution of a dispersion agent which in most instances was KTPP, and adding titanium dioxide pigment as rapidly as it could be wetted to the dispersion solution while agitating the latter vigorously using, for example, a dispersator fitted with a Cowles-type blade.

Pursuant to the objects of the invention, the amount of titanium dioxide pigment added was such as to provide a concentration within the range above about 60 to 65% $TiO_2$, on a slurry weight basis.

TEST

The pigment may be evaluated by any latex-paint tinting strength test. The test employed for the subject examples is referred to as the Latex $C^5$ Tinctorial Strength Test, and is fully described in the reference Physical Test Methods, T and D Department U S T P, issued July 5th, 1972, page P-15. Essentially, the test comprises adding the subject pigment to a composite latex vehicle containing a colorant and measuring the reflectance of the paint using a Colormaster Differential Colormeter, Model IV of V (Mfg. Eng and Equip Corp., 250 Titua Avenue, Warrington, Pa.). It is to be noted that comparisons between tinctorial strengths of paints made with dry $TiO_2$ pigment vs paints made with $TiO_2$ slurries, are made at equal $TiO_2$ pigment concentrations.

Also, all slurries were tested for dilatancy as evaluated by a Hercules High Shear Viscometer operating at a maximum shear rate of 4,084 second-1.

The following examples will further serve to illustrate the invention:

EXAMPLE I

The test pigment used comprised a rutile titanium dioxide pigment having a post-treatment of about 8% $SiO_2$ and about 5% $Al_2O_3$, and an oil absorption of 46. A series of four aqueous slurries [a-d] were prepared using the same $TiO_2$ pigment in each instance wherein slurries of various concentrations were prepared by adding the pigment in various amounts, to aqueous solutions containing 0.7% KTPP, as the dispersing agent. During additions of the titanium dioxide pigment the slurries were stirred vigorously using a dispersator equiped with a Cowles-type blade and operated at high speeds. The $TiO_2$ pigment slurries were then added to a standard latex-base formulation to form a paint. Data pertaining to the preparation in the testing of the four paint specimens are shown in the table below.

From the data, it is clear that a titanium dioxide slurry having a titanium dioxide pigment concentration of 69% was relatively non-dilatant, its viscosity being 25 centipoise. However, when added to a latex-base formulation to form a paint, the tinting strength of the latter was only 1805 which corresponded to a decrease of 270 units of measure from the tinctorial strength of latex-paint prepared from the original dry pigment. However, when a slurry was prepared having a titanium dioxide concentration of 65%, it was non-dilatant [viscosity 15 cp] and the latex-base paint made therefrom had a tinctorial strength of 1905; and slurries prepared at decreasing concentrations, that is 64%, 62% and 61%, respectively, formed latex-base paints having steadily increasing tinctorial strengths, the slurry at 61% $TiO_2$, as solids, providing a latex-base paint having a tinctorial strength of 2050 — essentially equal to that of a paint prepared with dry pigment.

EXAMPLE II

A second series of slurries was made using a titanium dioxide pigment post-treated with 8% $SiO_2$ and 5.2 $Al_2O_3$. Its oil absorption was 46. Four slurries were prepared at pigment concentrations of 65%, 64%, 63 and 60%, respectively, in the manner described above using the high speed dispersator for mixing.

As shown in the table below, a latex-base paint prepared from the dry pigment had a tinctorial strength of 2030. When a slurry of 65% $TiO_2$ was used in preparing a latex-base paint, the tinctorial strength dropped to 1905; but when the $TiO_2$ pigment slurries prepared at concentrations of 64%, 63% and 60%, respectively, were tested the tinctorial strengths of the latex-base coating compositions prepared therefrom increased steadily to 2050 — the latter being essentially that of the latex-base paint prepared from dry pigment.

EXAMPLE III

A third series of slurries was made using a titanium dioxide pigment post-treated with 7.5% $SiO_2$, and 5% $Al_2O_3$. The pigment had a relatively high oil absorption of 43, and three non-dilatant slurries of different $TiO_2$ pigment concentrations were prepared as in Example 1.

As shown in the table, a latex-base paint prepared from a dry pigment having the same oil absorption had a tinctorial strength of 1960. The slurry having a $TiO_2$ concentration of 65% produced a latex-base paint having a tinctorial strength of 1870 while the $TiO_2$ pigment slurries of decreasing $TiO_2$ concentrations produced latex-base paints having steadily increasing tinctorial strengths the highest being 1945 for a slurry of 60% $TiO_2$ pigment concentration.

EXAMPLE IV

A fourth series of slurries was made this time using a titanium dioxide pigment post-treated with 5% $SiO_2$ and 3% $Al_2O_3$. The pigment had an oil absorption of 36, which valve represents a comparatively low oil absorption valve for $TiO_2$ pigments used in latex paint formulations. Four flurries of different $TiO_2$ concentrations were prepared using the dispersant of Example 1. As shown in the table, a latex-base paint prepared from a dry pigment having the same oil absorption had a tinctorial strength of 1890. The $TiO_2$ pigment slurries prepared according to this example varied in concentration from 66%, 65%, 64% and 60%, all were non-dilatant and were added to latex-base formulations to form latex-base paints. The latex-base paints prepared from all these slurries showed essentially equivalent tinctorial strengths to that of the latex paint prepared from the dry pigment. Thus, illustrating that the unexpected loss in tinctorial strength that occurs when pigment slurries are used of higher than 65% $TiO_2$ concentration, is confined to pigments of relatively high oil absorption, i.e., above 36.

From the foregoing description and examples, it is clear that there is a critical relationship between the pigment concentration of aqueous $TiO_2$ pigment slurries used in latex-base formulations and the tinctorial strength of the latex-base paint prepared therefrom; that pigment slurries of a concentration greater than 65% $TiO_2$ produces a serious lowering in tinctorial strength of a latex-base paint as compared to the tinctorial strength of a latex-base paint produced by dry $TiO_2$ pigment additions; that in the range of from 65% to above about 60% $TiO_2$ pigment slurry concentration, the tinctorial strength of the latex-base paint increases and may actually equal that of a latex-base paint prepared from a dry pigment; and, that this phenomenon is most readily apparent in titanium dioxide pigments characterized by high oil absorption such as usually accompanies treatment of $TiO_2$ pigment with relatively high amounts of hydrous oxides such as silica, aluminia, and titania.

TABLE

| EXAMPLE | PIGMENT TREATMENT (%) | SLURRY CONCENTRATION (%) | VISCOSITY AT 4084 SEC-1 | OA | TINCTORIAL STRENGTH OF LATEX-PAINT | |
|---|---|---|---|---|---|---|
| | | | | | $TiO_2$ SLURRY | $TiO_2$ DRY |
| I | 8.0 $SiO_2$ 5.1 $Al_2O_3$ | — | — | 46 | — | 2075 |
| (a) | | 69 | 25cp | do. | 1805 | |

TABLE—Continued

| EXAMPLE | PIGMENT TREATMENT (%) | SLURRY CONCENTRATION (%) | VISCOSITY AT 4084 SEC-1 | OA | TINCTORIAL STRENGTH OF LATEX-PAINT | |
|---|---|---|---|---|---|---|
| | | | | | $TiO_2$ SLURRY | $TiO_2$ DRY |
| (b) | | 65 | 21cp | do. | 1965 | |
| (c) | | 62 | 23cp | do. | 2010 | |
| (d) | | 61 | 22cp | do. | 2050 | |
| II | 8.0 $SiO_2$ 5.2 $Al_2O_3$ | | | 46 | | 2030 |
| (a) | | 65 | 33cp | do. | 1905 | |
| (b) | | 64 | 94cp | do. | 1935 | |
| (c) | | 63 | 27cp | do. | 1945 | |
| (d) | | 60 | 30cp | do. | 2050 | |
| III | 7.5 $SiO_2$ 5.0 $Al_2O_3$ | | | 43 | | 1960 |
| (a) | | 65 | 20cp | do. | 1870 | |
| (b) | | 64 | 46cp | do. | 1920 | |
| (c) | | 60 | 19cp | do. | 1945 | |
| IV | 5.0 $SiO_2$ 3.0 $Al_2O_3$ | | | 36 | | 1890 |
| (a) | | 66 | 52cp | do. | 1915 | |
| (b) | | 65 | 26cp | do. | 1895 | |
| (c) | | 64 | 21cp | do. | 1915 | |
| (d) | | 60 | 13cp | do. | 1890 | |

We claim:

1. An aqueous titanium dioxide pigment slurry having a solids content from 60 to 65 percent on a slurry weight basis, said slurry being adaptable for use in latex paints and comprising a dispersing agent in an amount from 0.2 to 0.7 percent on pigment weight basis and a titanium dioxide pigment, said pigment in said slurry having a post treatment coating consisting of from 5 to 8 percent hydrous silicon oxide, from 3 to 5.2 percent hydrous aluminum oxide and from 0 to 2 percent hydrous titanium oxide, thereby producing a coated titanium dioxide pigment having an oil absorption of from 36 to as high as 46.

2. An aqueous titanium dioxide pigment slurry according to claim 1 wherein said dispersant is potassium tripolyphosphate.

* * * * *

UNITED STATES PATENT OFFICE
CERTIFICATE OF CORRECTION

Patent No. 3,847,640      Dated November 12, 1974

Inventor(s) J. M. Daubenspeck and Bernard Holton Jett

It is certified that error appears in the above-identified patent and that said Letters Patent are hereby corrected as shown below:

On face of Patent:

(73) Assignee: A L Industries, Inc., New York, N. Y.

CHANGED TO:

(73) Assignee: N L Industries, Inc., New York, N. Y.

Signed and sealed this 4th day of February 1975.

(SEAL)
Attest:

McCOY M. GIBSON JR.       C. MARSHALL DANN
Attesting Officer      Commissioner of Patents